United States Patent [19]

Dorfman

[11] 4,239,940
[45] Dec. 16, 1980

[54] CARRIER CURRENT COMMUNICATIONS SYSTEM

[76] Inventor: Bertrand Dorfman, c/o Codata Corporation, 520 Nuber Ave., Mt. Vernon, N.Y. 10550

[21] Appl. No.: 973,157

[22] Filed: Dec. 26, 1978

Related U.S. Application Data

[62] Division of Ser. No. 757,736, Jan. 7, 1977, Pat. No. 4,139,735.

[51] Int. Cl.³ .................... H04M 11/00; H04H 1/08
[52] U.S. Cl. .................... 179/2.51; 340/310 R; 370/71
[58] Field of Search .......... 179/2.5 R, 2.5 A, 2.5 B, 179/2.51, 82; 340/310 R, 310 A, 151; 370/71, 72, 73

[56] References Cited

U.S. PATENT DOCUMENTS

| | | | |
|---|---|---|---|
| 1,945,629 | 2/1934 | Duncan, Jr. | 179/2.5 B |
| 2,023,857 | 12/1935 | Satterlee et al. | 179/2.5 R |
| 2,179,612 | 11/1939 | Butler | 179/2.5 B |
| 2,389,257 | 11/1945 | Halstead | 179/2.5 B |
| 3,949,172 | 4/1976 | Brown et al. | 179/2.5 R |
| 4,012,733 | 3/1977 | Whyte | 179/2.5 R |
| 4,020,289 | 4/1977 | Anderson | 179/2.5 R |
| 4,139,735 | 2/1979 | Dorfman et al. | 179/2.5 R |
| 4,142,178 | 2/1979 | Whyte et al. | 340/310 R |

Primary Examiner—Thomas A. Robinson

[57] ABSTRACT

A plurality of transmitters and receivers arranged for carrier current communications are generally placed throughout a large building. The transmitters and receivers are coupled to selected portions of the power distribution system. The selected portions are stairwell exit and lighting risers emanating from the same location of contiguous circuit breakers. Coupling circuits are applied to both remote transceivers and the central station transceivers.

18 Claims, 6 Drawing Figures

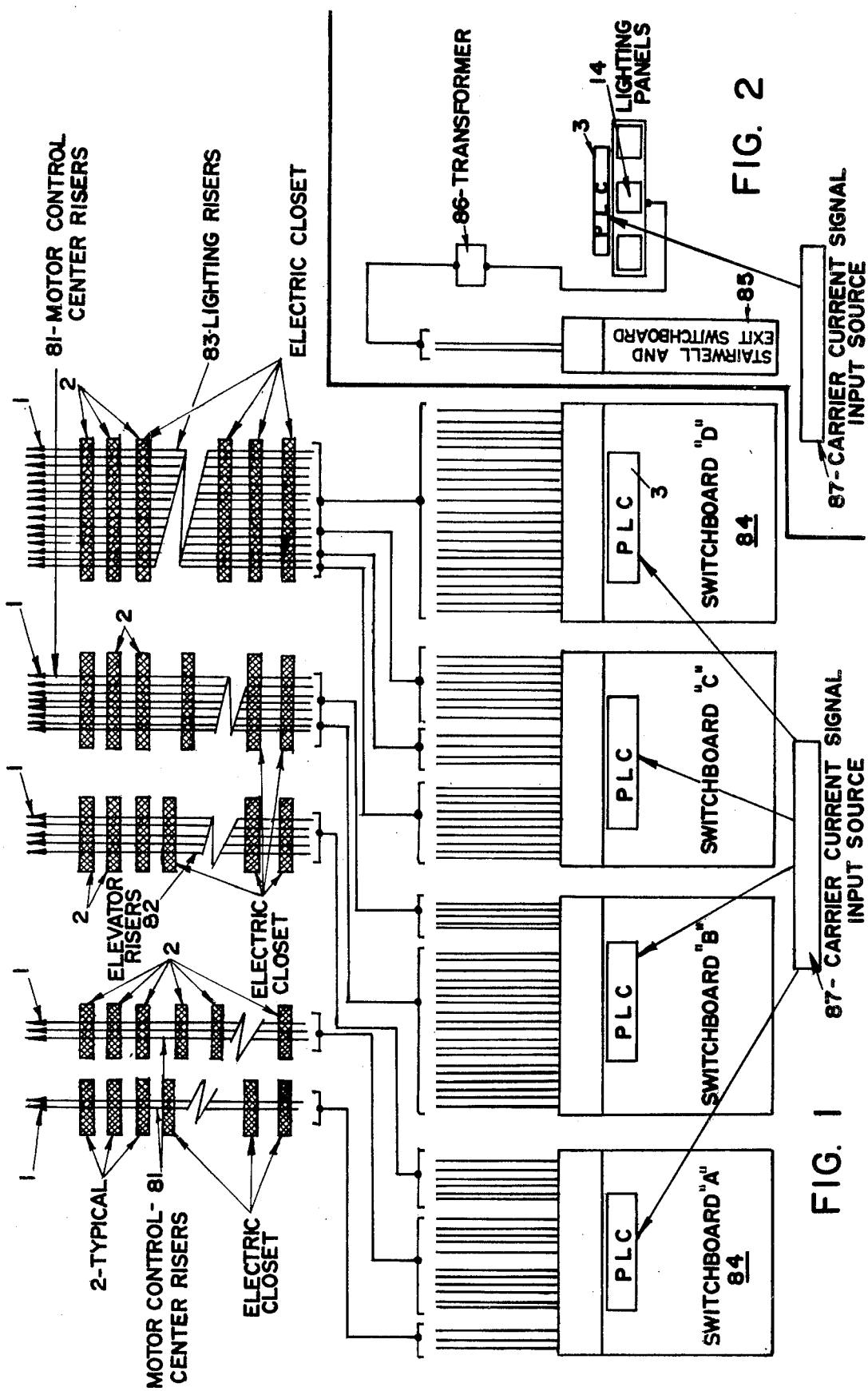

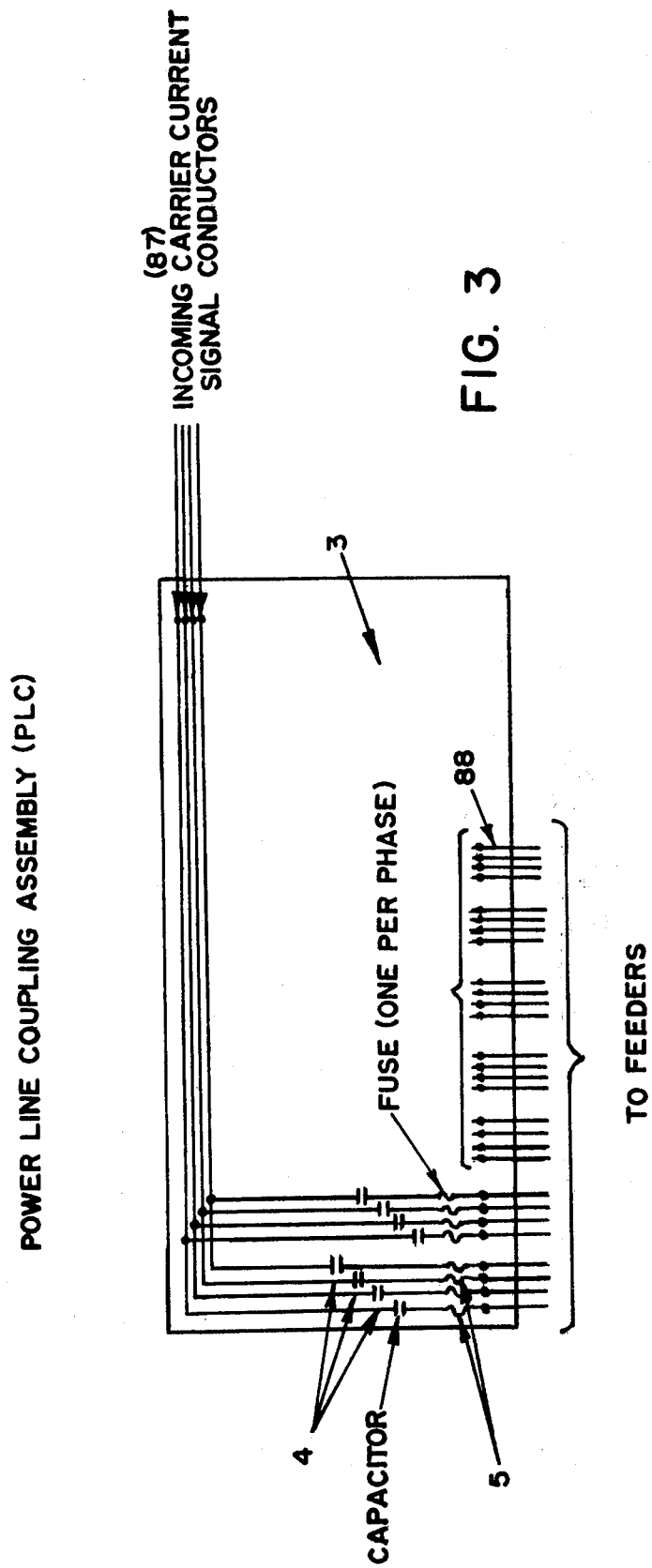

SCHEMATIC DIAGRAM OF EQUIPMENT IN ELECTRIC CLOSETS SERVING OFFICE TENANT LOADS

CARRIER CURRENT COMMUNICATIONS SYSTEM

This application is a division of Ser. No. 757,736, filed Jan. 7, 1977 and now issued as U.S. Pat. No. 4,139,735 date Feb. 13, 1979.

This invention relates to the method of implementing a carrier current communications and control system in large multi-storied buildings.

Carrier current systems utilize existing power distribution systems (systems of wires, raceways, protective and disconnect devices, transformers, etc., installed for the purpose of distributing low frequency (50 to 400 Hertz) alternating current power in a building) to provide the electrical path for non-power related carrier transmissions modulated in some manner in order to transmit voice and or data individually or in combination. These carrier signals are transmitted throughout the building via the existing power distribution system simultaneously with the transmission of low frequency power. In a carrier current system, transmitters generate modulated carriers which are coupled onto the existing power distribution system via an appropriate coupling network, receive and demodulate the carrier providing the desired transmission of voice and/or data signals.

At present in order for a carrier current system to effectively transmit and receive information, AC power line coupling devices must be located throughout the building at all transformers, distribution panels and phase separation and protection networks. Each AC power line must be considered a separate path in that at the operating fequencies considered practical for carrier current communications the effects of transformers, separate riser networks, etc., present such high impedance to the communications link that it must be considered an open circuit and therefore a separate line. To unify this plurality of individual links, AC power line coupling devices are used.

AC power line coupling devices are frequency selective networks. When a carrier current system is used to transmit information in a building, it is possible and often desirable to locate transmitters and/or receivers at every location which is either a source or destination of information. In applications where a relatively small number of such locations (either source or destination) are required, individual transmitters and receivers at each location are used. However, where a relatively large number of locations exist, a smaller number of transmitters and receivers is used and some form of multiplex arrangement (time, frequency or a combination thereof) is used to communicate with two or more devices via a single receiver or transmitter. This approach requires the use of a multiplexer with the transmitter and a companion demultiplexer with the receiver.

The AC power line coupling devices add cost to the system, both in their manufacture and in the cost of installing them. In a large building in which a great many high impedance devices such as transformers must be coupled with AC power line coupling devices, the cost of carrier current communications is increased.

Moreover, the high attenuation, high and dynamic loading and noise levels normally experienced in the power distribution systems in a building degrade the reliability and performance when communicating over the power lines. The power lines in a building experience continual, significant variations in loading and as such make successful transmission difficult. Signal input and output requirements are constantly changing as extreme swings in load levels are experienced. Moreover, these variations are not uniform throughout the entire building but may exist in any number of combinations of locations. This makes for great difficulty in the successful design of receivers and transmitters operating in this environment. Dynamic loading conditions also cause very high noise levels as certain types of loads come on and off the power lines. This type of noise causes loss of information and requires special design techniques in order to maintain reliable system operation.

Accordingly, an object of this invention is to provide a carrier current communications system in a building which employs a minimal number of AC power line coupling devices for communications substantially throughout the building.

A further object of this invention is to provide a carrier current communications system with improved reliability and performance.

A further object of this invention is to provide a carrier current system in which a relatively small number of transmitters and receivers serve a relatively large number of end devices for communications over the power distribution system of a building.

I have found that coupling the transmitters and receivers to certain selected portions of the power distribution system which originate from a common point does not necessitate coupling an inordinate number of transformers, distribution panels, disconnect and/or protective devices.

Moreover, it is advantageous to couple the transmitters and receivers to selected lightly loaded portions of the power distribution system since attenuation of a carrier current signal depends on the power load connected to the selected portion of the power distribution system and it is desirable to minimize attenuation.

Advantageously, the selected portions of the power line should be electrically and physically secure. Electrical security implies that no unauthorized loads be connected and physical security means that the selected circuit not be subject to damage during normal building operations including cleaning and tenant renovations.

The location of the selected portions of the power distribution system advantageously should pass through areas of the building which permit placing transmitters, receivers, multiplex equipment, etc., at convenient locations. For example, it may not be acceptable to locate a cabinet containing electronic equipment on the wall of a lobby of a modern office building or in an elaborately furnished conference room.

Advantageously, each of the selected portions of the power distribution system should be in close proximity to a group of end devices; this will minimize the requirement for power line couplers or dedicated horizontal wiring, if this technique is used.

System design is very seriously affected by performance specifications and the environment in which the system must operate. As previously mentioned, the usual approach to the design of a carrier current system is to locate receivers and transmitters with each end device. These units and their respective end devices are then placed throughout the building. If the alternate method of receiving and transmitting using multiplex techniques is used, extensive installation work is required. In both cases significant quantities of power line couplers must be installed. Using sections of the power system found within a building, which are strategically located, allow for optimum system design with respect to the trade-off between multi-receiver/transmitter units, employing more installation and less equipment, and single receiver/transmitter units employing less installation and more equipment. This is of significant value with respect to reduced cost and increased reliability in a system. In addition, it is advantageous to use sections of the power system which would require a minimum of power line couplers and exhibit little if any of the normal dynamic loading found on the power lines. These characteristics would increase system efficiency and reliability and decrease cost.

I have found that the portions of the building power distribution system which best satisfied the above findings are the stairwell exit, landing and half landing lighting risers.

Accordingly, each of the above objects and features of this invention will be readily understood from the following description, taken together with the drawings and the detailed notations thereon in which:

FIG. 1 is a schematic representation of a typical AC power riser distribution network in a building.

FIG. 2 is a portion of the AC power distribution network relating to the stairwell and exit lighting riser system.

FIG. 3 is a typical power line coupling assembly.

Figure 4:
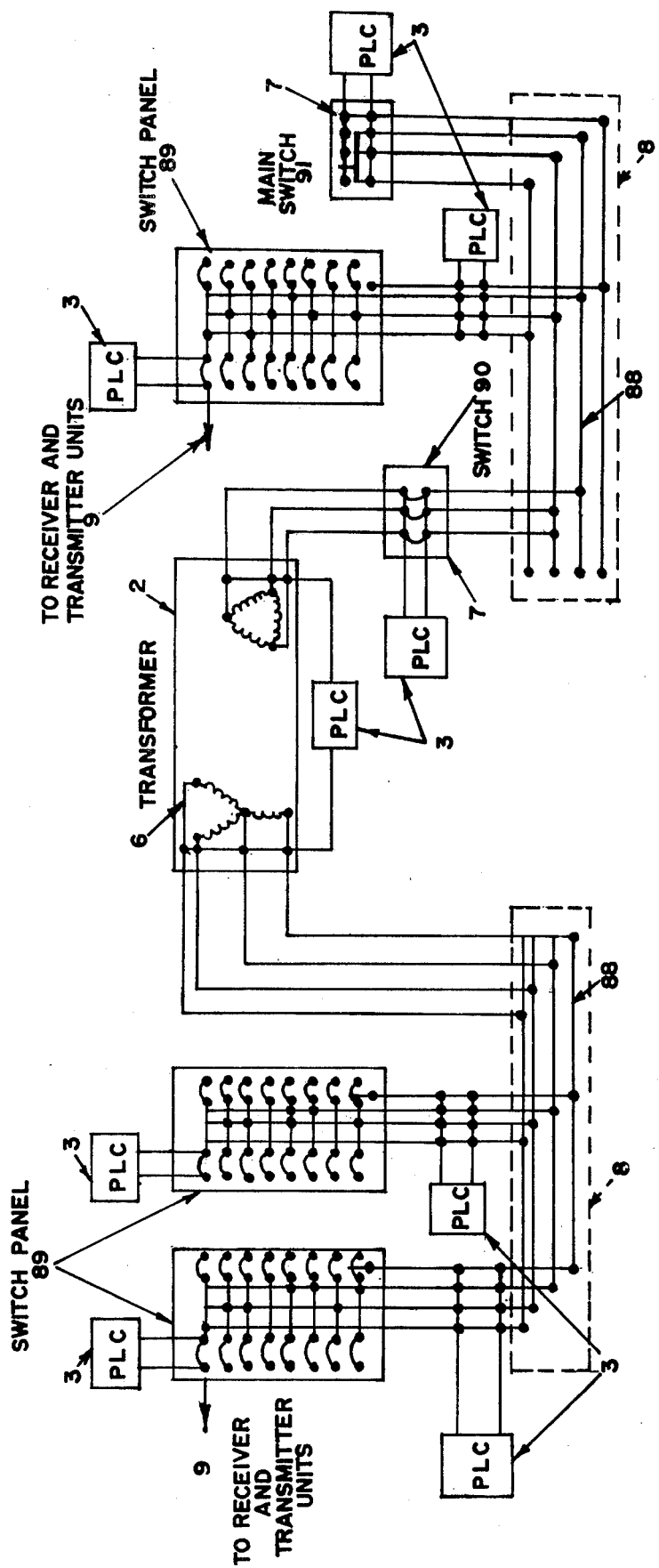
FIG. 4 shows connection of power line coupling devices in a typical electric closet.

Referring to FIGS. 1 and 2, a typical AC power riser distribution network (1) in a building has a very large number of locations in electric closets (2) to be coupled in order to allow for a carrier current communications system to communicate to and from any point in the building.

These electric closets (2) are located on riser distribution network risers, such as motor control center risers (81), elevator risers (82), and lighting risers (83). The risers emanate from switchboards (84) in this building basement.

In addition a separate stairwell and exit switchboard (85) feed through a transformer (86) into lighting panels (14) which are connected together through a power line coupler (3), to be more fully described. Power line coupling couplers (3) are located in the adjacent switchboards (84) in the main distribution system in the building. Carrier current signals are impressed from carrier current input signal source (87).

Carrier current signals are also impressed from carrier current signal input sources (87) through power line couplers (2) on the riser side of the stairwell exit and lighting panels. AC power line couplers are used in switch panels (89), switches (90) and main switches (91). The switch panels (89), are connected to receiver and transmitter units (9).

FIG. 3 shows a typical AC power line coupling device (3) using capacitive devices (4) protected by fuses (5), which are required to connect various feeders (88) together.

Referring to FIG. 4, in the prior art, AC power line couplers (PLC) (3) were required to be located in a typical electrical closet (2) in a building in order to couple across-transformers (6), various phases in a multi-phase system (7), and tie feeder networks (8) together.

Figure 5:
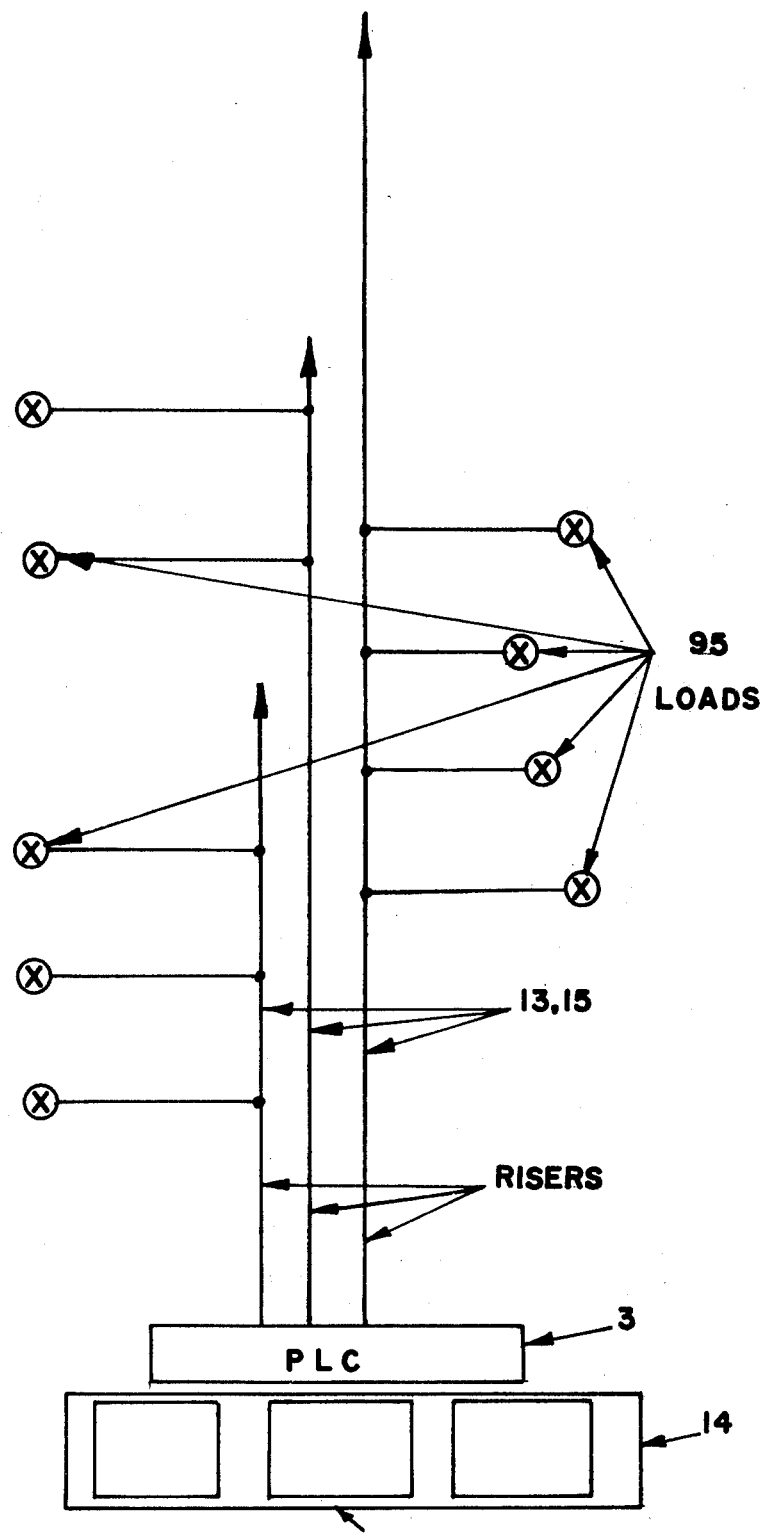
FIG. 5 is a schematic representation of a stairwell exit and lighting riser portion of a power distribution system in a building.
Figure 6:
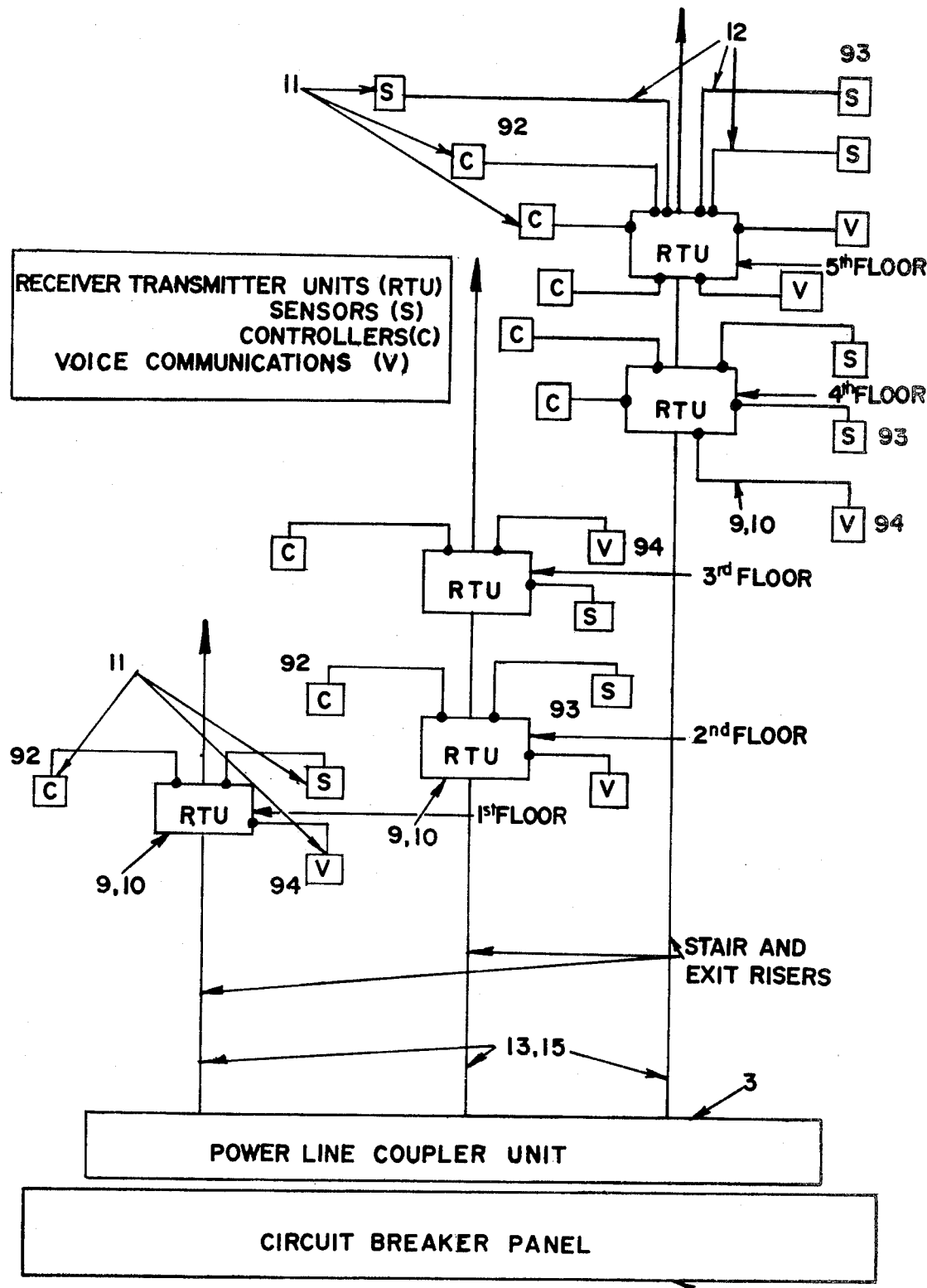
FIG. 6 is a schematic representation of a carrier current system coupled to a stair well exit and lighting riser portion in accordance with the invention.

Referring to FIGS. 5 and 6, a carrier current system is used to transmit information in a building. It is sometimes possible and desirable to locate transmitters and/or receivers at every location which is either a source or destination of information.

Where, as shown, a relatively large number of locations exist, a smaller number of transmitters and receivers (9) is used and a multiplex arrangement (10) (time, frequency or a combination thereof) is used to communicate with two or more devices (11), via a single receiver or transmitter.

These devices are controller (92), sensors (93) and voice communications devices (94), located at the different floors and at different places on each floor, at different distances from the building core; near where the stairwell and exit lighting risers (13) are located.

A multiplexer is used with the transmitter and a companion demultiplexer with the receiver.

FIG. 5 describes a stairwell exit and lighting riser system in a building. Loads (95) are connected on the different floors to this riser system.

FIG. 6 describes a typical connection of a carrier current communications system according to the invention. It includes a small power line coupler (3). This device provides the common carrier current connection which makes all phases or risers one contiguous transmission path to all carrier current signals. The system also includes horizontal wiring (12) using the existing stair and exit risers (13) in a building and contiguous circuit breaker panels (14) from which the existing risers (13) emanate.

The stairwell exit and lighting riser portion (153) of the power distribution system is selected for coupling the transmitters and receivers (9) thereto for carrier current communications.

Stairwells are usually distributed about the service core of the building, making all regions of a floor easy to reach.

All of the stairwell lighting circuits (13) originate from either a single circuit breaker panel (14) or from a small number of contiguous circuit breaker panels (14). These circuits are continuous in that no disconnect switches nor transformers have to be by-passed.

The power loading on stairwell risers (13) is moderate and uniformly distributed throughout its length; these circuits are precluded by regulation (city, state, etc.) from supplying nonstairwell loads. This means that attenuation and circuit noise is predictable and relatively constant because stairwell lighting does not vary with time.

Stairwell risers (13) are electrically secure because no receptacle outlets are permitted on these circuits. Further, they are physically secure because they are encased in conduit (15) in locations where they are not subject to damage during normal building operation including cleaning and renovation.

The origination point or points of the stairwell circuit are secure; the stairwell circuit breaker panels are located in a secure room because they are part of the building safety systems.

Carrier current equipment (transmitters and receivers (9) and multiplexers (10) can be readily located in stairwells without detracting from their fundamental or aesthetic values.

Stairwells are part of the building core; the majority of end devices which are part of a system also are in or near the building core, therefor minimizing the need for power line couplers or horizontal wiring if this technique is used.

The use of stairwell and exit lighting risers for carrier current transmission is a surprising choice because (a) there are not enough of them in any building to allow for connection to end devices with single receiver/transmitters, (b) they are, by code, not normally available for use, and (c) they are usually loaded such that the excess capacity available would not necessarily be sufficient to power all of the equipment comprising a system. The usual connection techniques call for source of power and transmission line to be the same point of connection. If a stairwell and exit riser cannot supply sufficient power to run the equipment, power can be obtained from any other nearby source, while the stairwell exit riser is used as a highly reliable and strategically located transmission link. These risers are also considered strategically located when thought of in conjunction with system partitioning. Deciding upon the most efficient number of functions to be performed by the receiver/transmitter units, together with their intended locations, makes the use of the stairwell and exit risers the optimum choice concerning efficiency.

I claim:

1. The method of transmitting and receiving electrical signals representing communication over an AC power distribution system in a large building comprising:
   (a) coupling a plurality of transmitters arranged and adapted for carrier current communications to a stairwell exit and lighting riser portion of the power distribution system, and
   (b) coupling a plurality of receivers arranged and adapted for carrier current communications to the same stairwell exit and lighting riser portion of the power distribution system.

2. The method according to claim 1 comprising:
   (a) connecting a plurality of terminal means to individual ones of the transmitters through multiplexers associated therewith, and
   (b) connecting a plurality of terminal means to individual ones of the receivers through multiplexers associated therewith.

3. The method according to claim 1 comprising coupling the transmitters and receivers to stairwell riser portions in the vicinity of the service core of the building.

4. The method according to claim 1 comprising coupling the transmitters and receivers to stairwell riser portions emanating from a common location of one or more contiguous circuit breaking apparatus.

5. The method according to claim 1 comprising placing the transmitters and receivers in the building stairwells with which their risers are associated.

6. The method according to claim 1 in which a transmitting and receiving central station is coupled to the stairwell and exit lighting riser comprising:
   (a) coupling the transmitting portion to the riser by an individual wire pair having significant reactive impedance,
   (b) tuning out the impedance at the center frequency of the transmitted signals,
   (c) coupling the receiving portion to the riser by an individual wire pair of significant reactive impedance,
   (d) tuning out the impedance at the center frequency of the received signals, and
   (e) coupling the wire pairs to the riser by coupling means having low impedance at radio frequencies.

7. The method according to claim 6 comprising coupling both wire pairs to the stairwell and exit lighting riser by capacitive coupling means having low impedance at radio frequencies.

8. The method according to claim 7 comprising placing inductance between the receiving portion and the capacitive coupling means.

9. The method according to claim 8 comprising connecting the central station to the riser side of circuit breaking means in the AC power distribution system.

10. The method according to claim 6 comprising presenting high impedance to the stairwell and exit lighting riser at the remote stations at the center frequency of the transmitted signals.

11. A carrier current communications system for a large building having AC power distribution means including stairwell exit and landing light power distribution risers comprising:
    (a) carrier current transmission means for transmitting signals,
    (b) carrier current receiving means for receiving signals, and
    (c) means for coupling the transmission means and the receiving means to portions of the AC power distribution means which are secure from excessive loading and physical disruption comprising means for coupling to the stairwell exit and landing risers for carrier current communications therebetween.

12. A carrier current system according to claim 11 in which the power distribution means are arranged and adapted to pass through the building in the vicinity of locations advantageous for the transmitting and receiving means.

13. A carrier current system according to claim 12 comprising means for securing the circuit breaker means from electrical and physical disruption.

14. A carrier current system according to claim 11 in which the power distribution means is distributed substantially uniformly throughout the building.

15. A carrier current system according to claim 14 in a building having a service core, in which the transmission means and receiving means are coupled to stairwell risers located in the vicinity of the service core.

16. A carrier current system according to claim 14 in which the transmission means and receiving means are located in the stairwells of the risers with which they are coupled.

17. A carrier current system according to claim 11 in a building having a plurality of contiguous circuit breaker means from which power distribution risers emanate in which the transmission means and the receiving means are coupled to stairwell risers emanating from at least one of a plurality of contiguous circuit breaker means.

18. A carrier current system according to claim 17 comprising means for securing the circuit breaker means from electrical and physical disruption.

* * * * *